US010639824B2

United States Patent
Arima et al.

(10) Patent No.: US 10,639,824 B2
(45) Date of Patent: May 5, 2020

(54) DIE ASSEMBLY FOR INTAKE PORT INSERT (71) Applicant: NISSAN MOTOR CO., LTD., Yokohama-shi, Kanagawa (JP)

(72) Inventors: Kazuki Arima, Kanagawa (JP); Takuya Taniguchi, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 7 days.

(21) Appl. No.: 15/748,227

(22) PCT Filed: Jul. 30, 2015

(86) PCT No.: PCT/JP2015/071685
§ 371 (c)(1),
(2) Date: Jan. 29, 2018

(87) PCT Pub. No.: WO2017/017843
PCT Pub. Date: Feb. 2, 2017

(65) Prior Publication Data
US 2018/0215081 A1    Aug. 2, 2018

(51) Int. Cl.
*B29C 41/06* (2006.01)
*F02M 35/104* (2006.01)
(Continued)

(52) U.S. Cl.
CPC .............. *B29C 41/06* (2013.01); *B29C 33/44* (2013.01); *B29C 33/76* (2013.01); *B29C 39/34* (2013.01);
(Continued)

(58) Field of Classification Search
CPC . B29C 33/0022; B29C 45/006; B29C 48/001; B29C 67/0003; B29C 2045/4089; F02M 35/10; F02M 31/205
(Continued)

(56) References Cited

U.S. PATENT DOCUMENTS 1,520,996 A * 12/1924 Bastian ................ B29D 99/006
229/406
7,882,886 B1 * 2/2011 Gretz ..................... B22D 17/22
(Continued)

FOREIGN PATENT DOCUMENTS

DE    19833618 A1    1/2000
JP    05200758 A *   8/1993  ........... B29C 33/485
(Continued)

OTHER PUBLICATIONS

English Translation for JPH05200758 (A), Takashina, Ryuji (Year: 1993).*

*Primary Examiner* — Leith S Shafi
*Assistant Examiner* — Edgaredmanuel Troche
(74) *Attorney, Agent, or Firm* — Faegre Drinker Biddle & Reath LLP (57) ABSTRACT

The present invention provides a die assembly for molding a resin-made insert having a sleeve that is inserted into an intake port of an internal combustion engine. Each sleeve has one inlet and two outlets. The die assembly includes an inner die and an outer die. The inner die includes an inlet side part and an outlet side part. The inlet side part and the outlet side part mold an inner peripheral surface of the sleeve in an assembled state, and are removed in mutually opposite directions. By means of this assembly, a sleeve having a complicated structure and shape can be molded easily.

4 Claims, 12 Drawing Sheets (51) Int. Cl.

| | |
|---|---|
| *B29C 45/33* | (2006.01) |
| *B29C 39/34* | (2006.01) |
| *B29C 45/44* | (2006.01) |
| *B29C 33/76* | (2006.01) |
| *F02F 1/42* | (2006.01) |
| *F02M 35/10* | (2006.01) |
| *B29C 33/44* | (2006.01) |
| *F02B 29/04* | (2006.01) |
| *B29C 45/10* | (2006.01) |
| *B29C 45/43* | (2006.01) |
| *B29L 31/24* | (2006.01) |
| *B29C 45/36* | (2006.01) |

(52) U.S. Cl.
CPC .............. *B29C 45/10* (2013.01); *B29C 45/33* (2013.01); *B29C 45/435* (2013.01); *B29C 45/44* (2013.01); *F02B 29/04* (2013.01); *F02F 1/42* (2013.01); *F02F 1/4257* (2013.01); *F02M 35/104* (2013.01); *F02M 35/10347* (2013.01); *B29C 45/36* (2013.01); *B29L 2031/24* (2013.01); *F02M 35/10085* (2013.01); *F02M 35/10321* (2013.01)

(58) Field of Classification Search
USPC ........................................................ 425/521
See application file for complete search history.

(56) References Cited

U.S. PATENT DOCUMENTS

2006/0027947 A1   2/2006   Arai et al.
2006/0125149 A1   6/2006   Takada et al.

FOREIGN PATENT DOCUMENTS

| JP | H05-200758 A | 8/1993 |
| JP | H10-9049 A | 1/1998 |
| JP | 2007-56794 A | 3/2007 |
| JP | 2008-144740 A | 6/2008 |
| JP | 4164686 B2 | 10/2008 |
| JP | 4178642 B2 | 11/2008 |
| JP | 2009-52491 A | 3/2009 |
| JP | 4497546 B2 | 7/2010 |

* cited by examiner

DIE ASSEMBLY FOR INTAKE PORT INSERT

FIELD OF THE INVENTION

The present invention relates to a die assembly for molding a resin-made insert having a sleeve that is inserted into an intake port of an internal combustion engine.

BACKGROUND OF THE INVENTION

In a conventional technique, an increase in a temperature of intake air in an internal combustion engine is suppressed by connecting intake ports of a cylinder head respectively to branch pipes of an intake manifold via resin sleeves.

As regards connecting an intake port and an intake manifold via a sleeve, JP2007-056794A, published by the Japan Patent Office in 2007, proposes forming a space between the sleeve and a wall surface of the intake port so that a temperature on the wall surface of the intake port is less likely to be transmitted to intake air.

JP2009-052491A, published by the Japan Patent Office in 2009, further proposes forming a through hole in a wall surface of the sleeve, through which fuel that has accumulated in the space on the outside of the sleeve is discharged to the inside of the sleeve.

SUMMARY OF THE INVENTION

This type of sleeve is provided as an intake port insert that includes a resin-made flange sandwiched between the cylinder head and the intake manifold of the internal combustion engine. An inlet of the sleeve is formed in the flange.

In a case where the internal combustion engine includes two intake ports for each cylinder, a branch pipe of the intake manifold and the inlet of the sleeve connected to the branch pipe are both still provided singly for each cylinder, and instead, the sleeve is bifurcated into two forks in an intermediate location and the forks are inserted respectively into the two intake ports of each cylinder. In other words, each sleeve has one inlet and two outlets.

However, when the sleeve is provided with this configuration, the structure and shape of the sleeve are complicated, making it difficult to cast the intake port insert.

It is therefore an object of the present invention to facilitate casting of an intake port insert having a sleeve that bifurcates into two forks midway.

To achieve this object, the present invention provides a die assembly for molding a resin-made insert having a sleeve that is inserted into an intake port of an internal combustion engine, the sleeve including an inlet into which intake air flows and two outlets from which the intake air flows. The die assembly includes an outer die configured to form an outer peripheral surface of the insert, and an inner die configured to form an inner peripheral surface of the insert. The inner die includes an inlet side part and an outlet side part that form the inner peripheral surface of the sleeve in an assembled state, and are removed in mutually opposite directions.

The details as well as other features and advantages of this invention are set forth in the remainder of the specification and are shown in the accompanying drawings.

DESCRIPTION OF THE PREFERRED EMBODIMENTS

Figure 1:
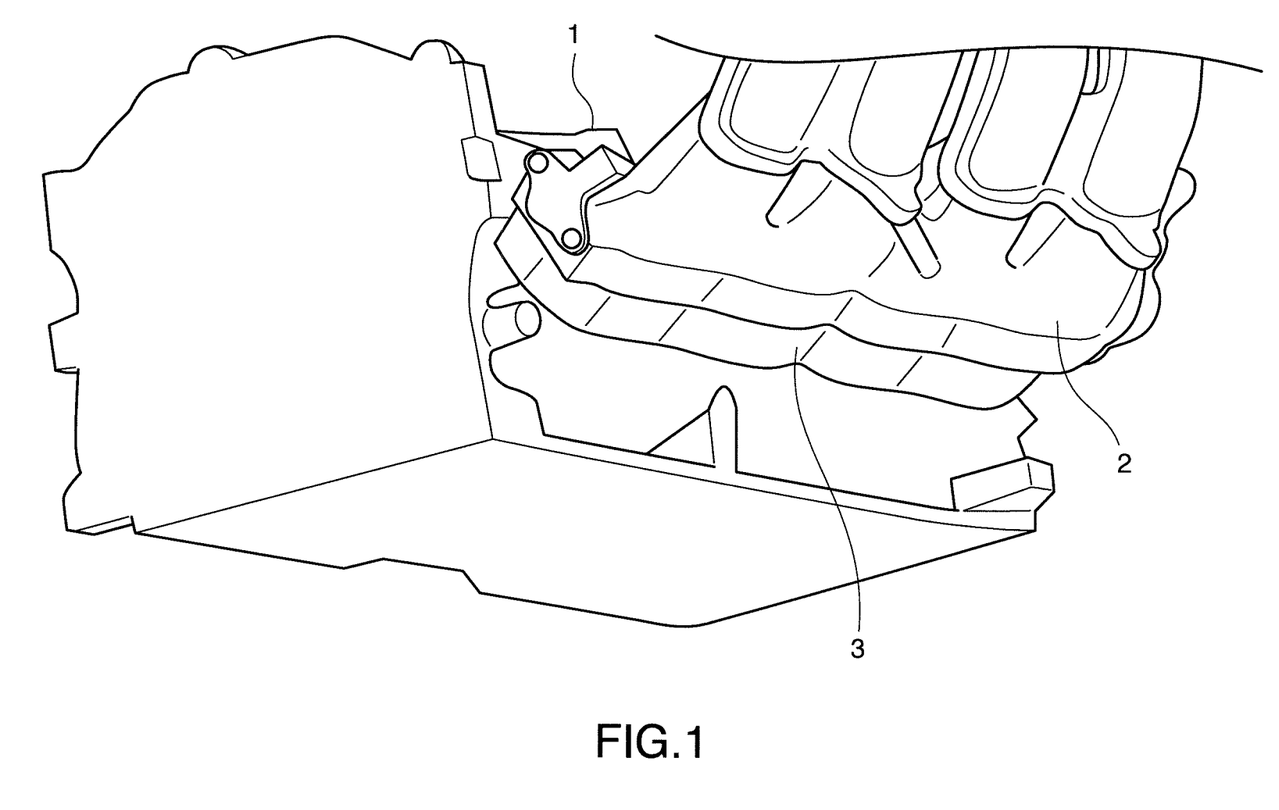
FIG. 1 is a perspective view of a cylinder head of an internal combustion engine having a resin-made insert that is molded using a die assembly according to the present invention.

Referring to FIG. 1 of the drawings, an intake manifold 2 is fixed to a cylinder head 1 of a multi-cylinder internal combustion engine. The intake manifold 2 includes branch pipes in an equal number to a number of cylinders of the engine.

In this embodiment, the internal combustion engine has four cylinders, and therefore the intake manifold 2 has four corresponding branch pipes. The intake manifold 2 is fixed to the cylinder head 1 via an insert 3. The cylinder head 1 is made of metal, and the intake manifold 2 is made of resin, which has a lower thermal conductivity than metal. The insert 3 is also made of resin.

Figure 2:
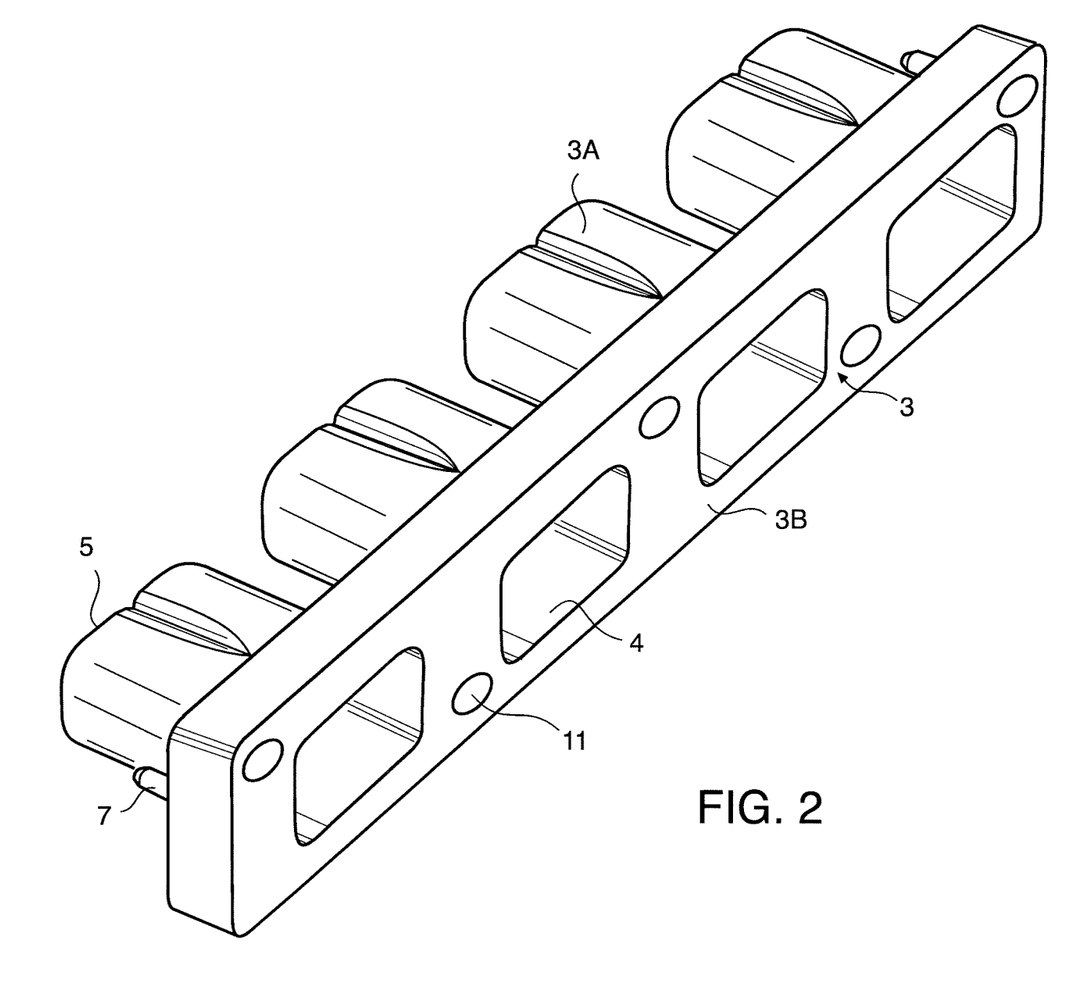
FIG. 2 is a schematic perspective view of the resin-made insert, which is constituted by a sleeve and a flange, seen from an inlet side thereof.
Figure 3:
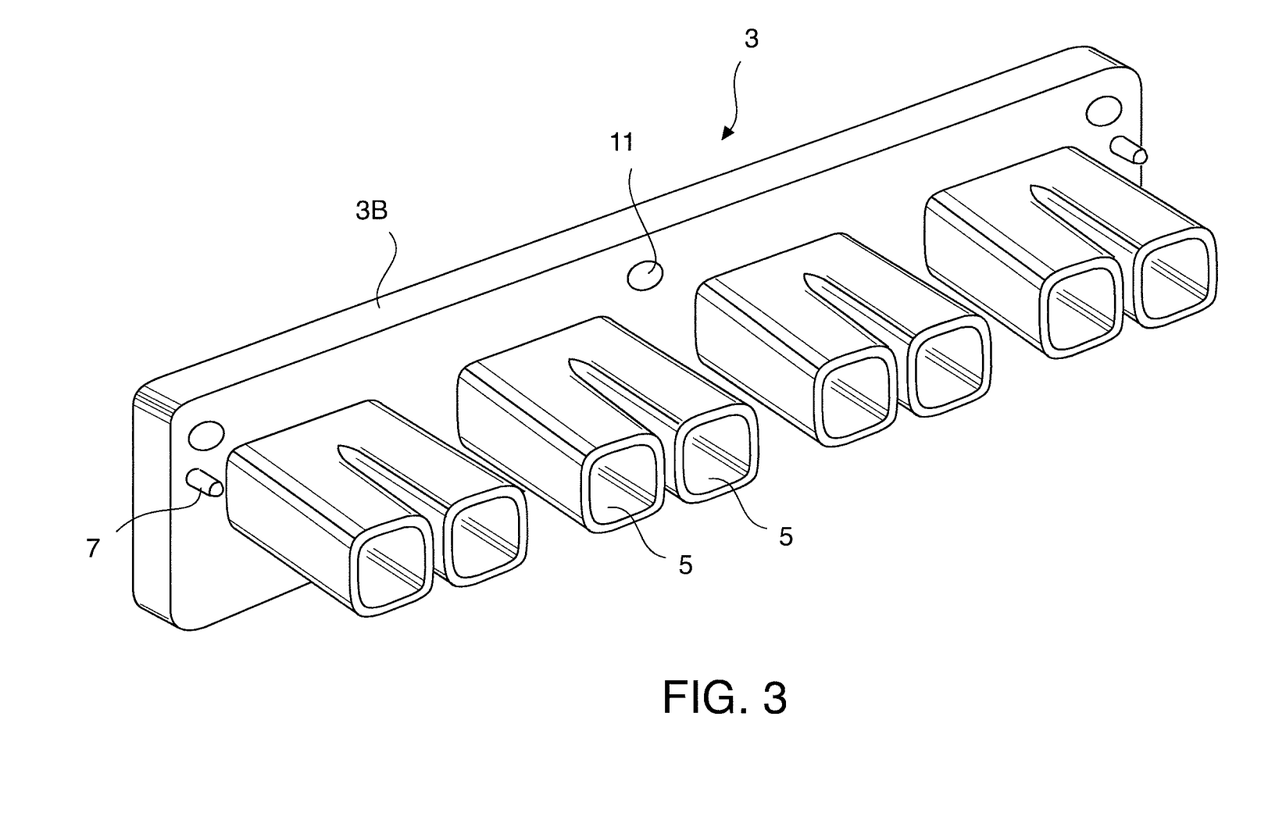
FIG. 3 is a schematic perspective view of the resin-made insert seen from an outlet side thereof.

Referring to FIGS. 2 and 3, the insert 3 is constituted by four sleeves 3A and a flange 3B connecting the sleeves 3A. A plurality of bolt holes 11 and a plurality of positioning projections 7 for fixing the intake manifold 2 to the cylinder head 1 via the insert 3 are formed on the flange 3B.

The insert 3 is fixed to a predetermined position of the cylinder head 1 together with the intake manifold 2 by the positioning projections 7 and bolts inserted into the bolt holes 11 in a state where the sleeves 3A are inserted respectively into intake ports of the cylinder head 1.

The internal combustion engine 2 includes two intake ports and two intake valves for each cylinder. Accordingly, each sleeve 3A bifurcates into two forks midway. In other words, each sleeve 3A includes one inlet 4 into which air flows from the branch pipe of the intake manifold 2, and two outlets 5 from which air introduced therein from the inlet 4 flows out so as to flow into the intake ports. The air introduced from the inlet 4 bifurcates inside the sleeve 3A so as to flow into the intake ports from the respective outlets 5.

Figure 10:
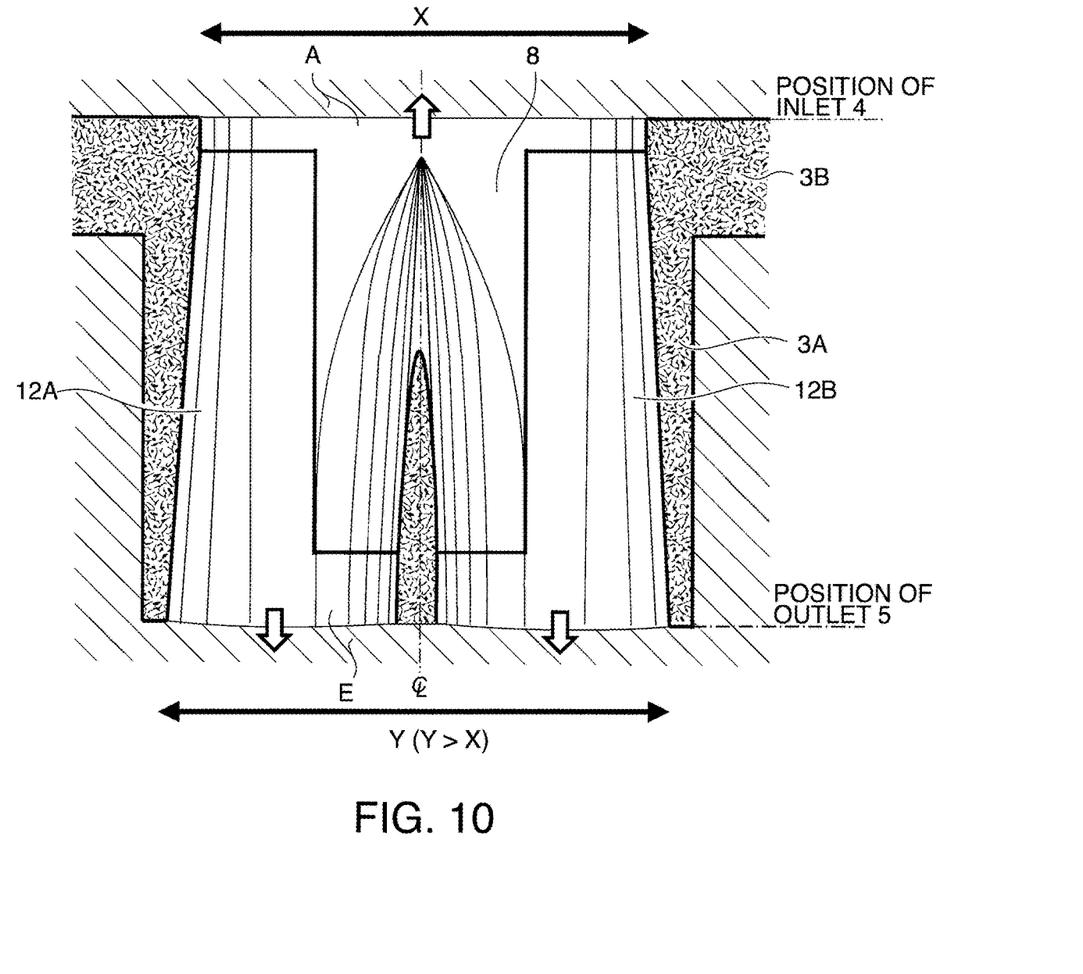
FIG. 10 is a composite diagram of a plan view and a lateral sectional view of main parts of the die assembly, illustrating a position of a parting line of an inner die formed from the first die and the fifth die.

Referring to FIG. 10, a width of each inlet 4 is set to be equal to a sum of respective widths of the two corresponding outlets 5. Here, the width of the inlet 4 and the width of the outlets 5 denote dimensions in a rectilinear direction linking respective centers of the inlets 4 of the respective sleeves 3A, or in other words dimensions in a left-right direction of the figure. A height of the inlet 4 is set to be equal to a height of the outlet 5. As a result of these settings, a sectional area of the inlet 4 is equal to a sectional area of the outlets 5.

A dimension X shown in the figure denotes a distance between wall surfaces of the inlet 4 (a distance between most distant wall surfaces of the inlet 4), measured along a line linking respective centers of the two outlets 5 of the sleeve 3A. A dimension Y shown in the figure corresponds to a distance between most distant wall surfaces of the two outlets 5, measured in the same direction. Since bifurcated portions are formed in the sleeve 3A, the dimension Y includes respective thicknesses of the bifurcated portions of the sleeve 3A after bifurcating into two forks, and a thickness of resin charged between the bifurcated portions. The dimension Y is therefore inevitably larger than the dimension X of the inlet 4.

A die assembly 20 according to this embodiment of the present invention is applied to mold the insert 3 configured as described above.

Figure 4:
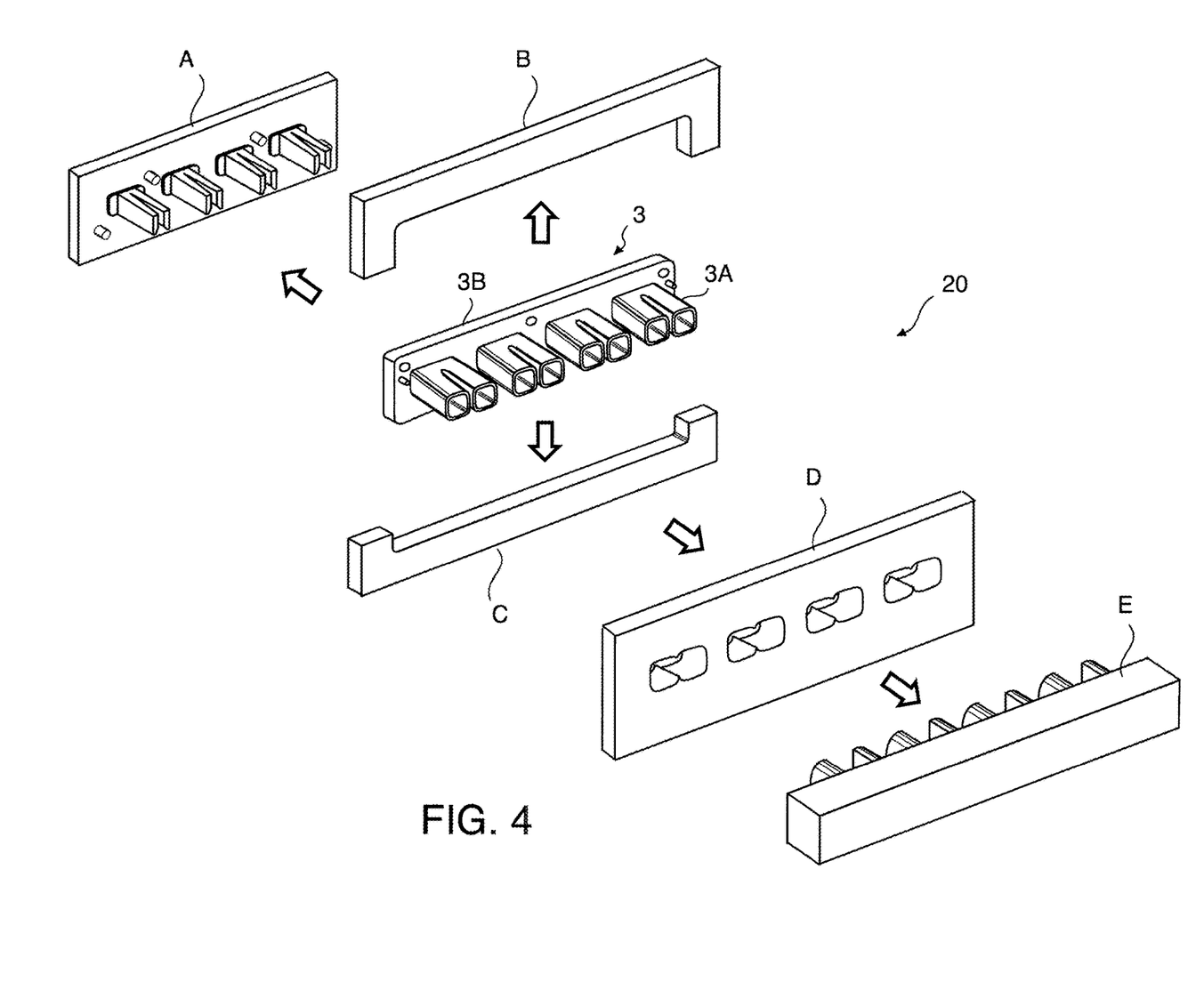
FIG. 4 is an exploded perspective view of a die assembly for molding the resin-made insert.

Referring to FIG. 4, the die assembly 20 is constituted by five dies A-E, namely a first die A to a fifth die E.

Figure 5:
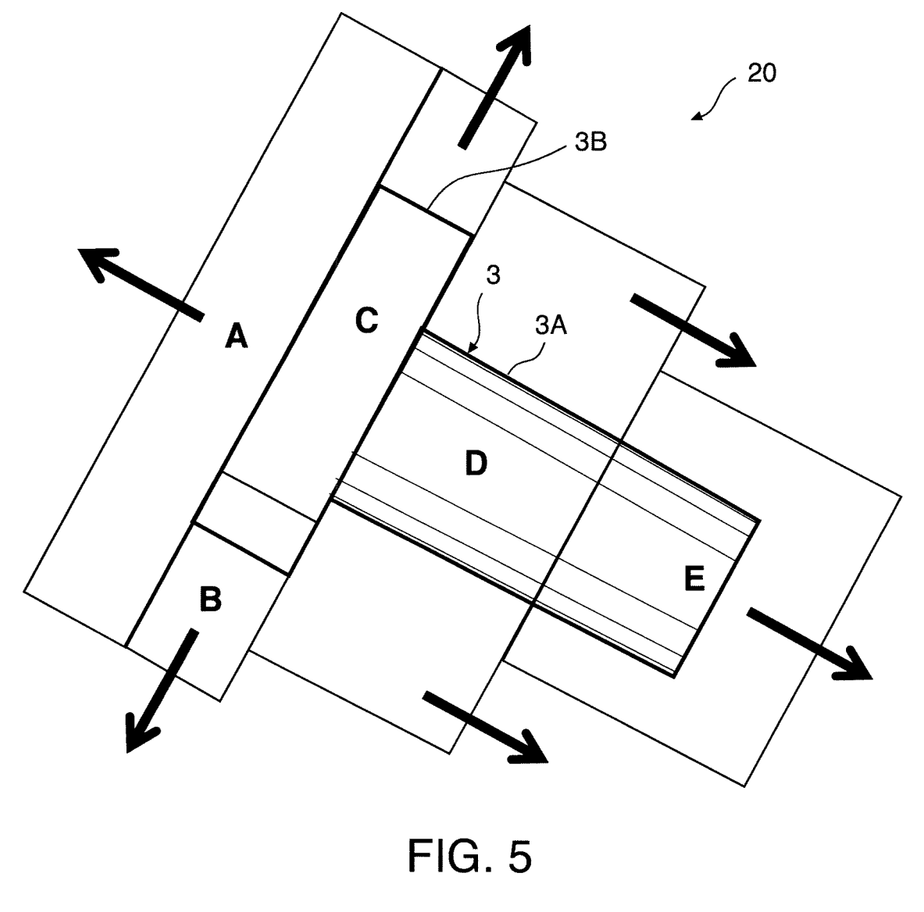
FIG. 5 is a composite diagram of a side view and a transparent view of the resin-made insert and first to fifth dies constituting the die assembly seen from the side.

Referring to FIG. 5, the dies A-E are assembled as shown in the figure. Thick lines in the figure denote the insert 3 that is molded using the die assembly 20. The insert 3 is molded by injecting resin into an inner side of the die assembly 20. For this purpose, a resin injection hole, not shown in the figure, is provided in the die assembly 20.

Of the five dies A-E, the first die A serves as an inner die for molding an inner peripheral surface of the sleeve 3A, while the second die B and the third die C serve as outer dies for molding the flange 3B. The fourth die D serves as an outer die for molding an outer peripheral surface of a base portion of the sleeve 3A. The fifth die E functions as both an inner die for molding the inner peripheral surface of the sleeve 3A cooperatively with the first die A, and an outer die for molding an outer peripheral surface of a tip end portion of the sleeve 3A.

In other words, an inner die of the die assembly 20 is constituted by the first die A and the fifth die E, and an outer die is constituted by the second to fifth dies B-E. Arrows in the figure denote directions in which force is exerted to remove the respective dies A-E.

Figure 6:
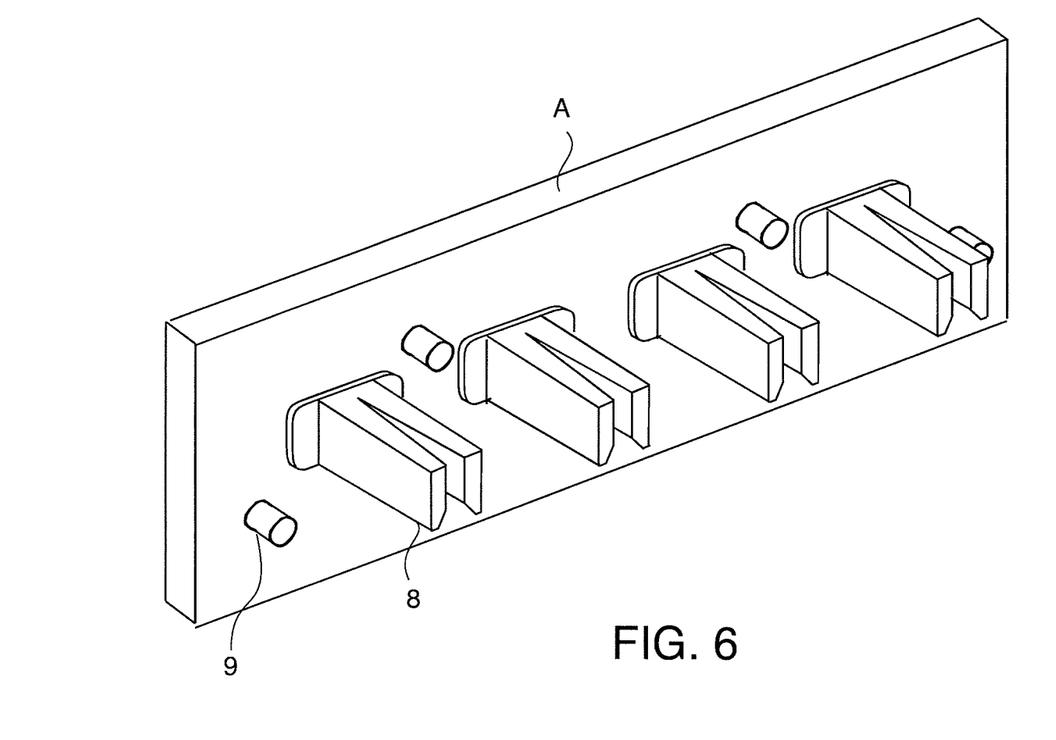
FIG. 6 is a perspective view of the first die.

Referring to FIG. 6, the first die A includes bifurcated projections 8 for molding the inner peripheral surface of each sleeve 3A, and columnar projections 9 for forming the bolt holes 11 in the flange 3B. Resin charged into a space between the bifurcated projections 8 forms a wall surface between the bifurcated portions of the sleeve 3A, as shown in FIG. 10.

Figure 9A:
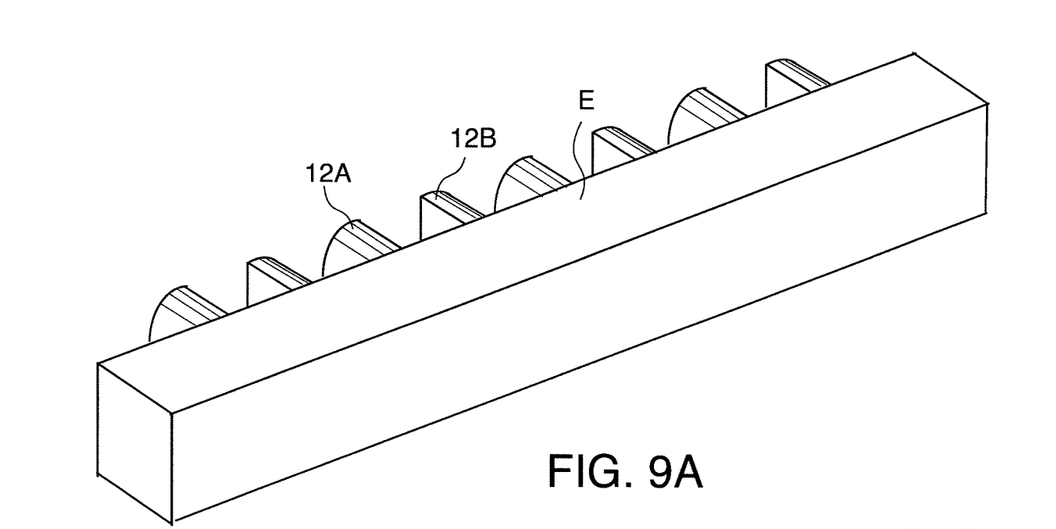
FIGS. 9A and 9B are a perspective view and a principle lateral sectional view of the fifth die.
Figure 9B:
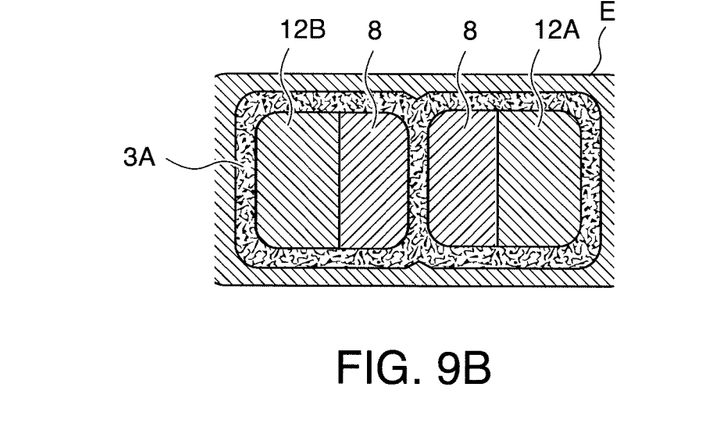

Referring to FIGS. 9A and 9B, the fifth die E includes a pair of projections 12A and 12B for each sleeve 3A. The pair of projections 12A and 12B are formed to contact respective side faces of the bifurcated projections 8 when the first die A and the fifth die E are assembled, as shown in FIG. 9B. Contact surfaces on which the pair of projections 12A and 12B contact the projections 8 are all formed as flat surfaces.

Figure 11A:
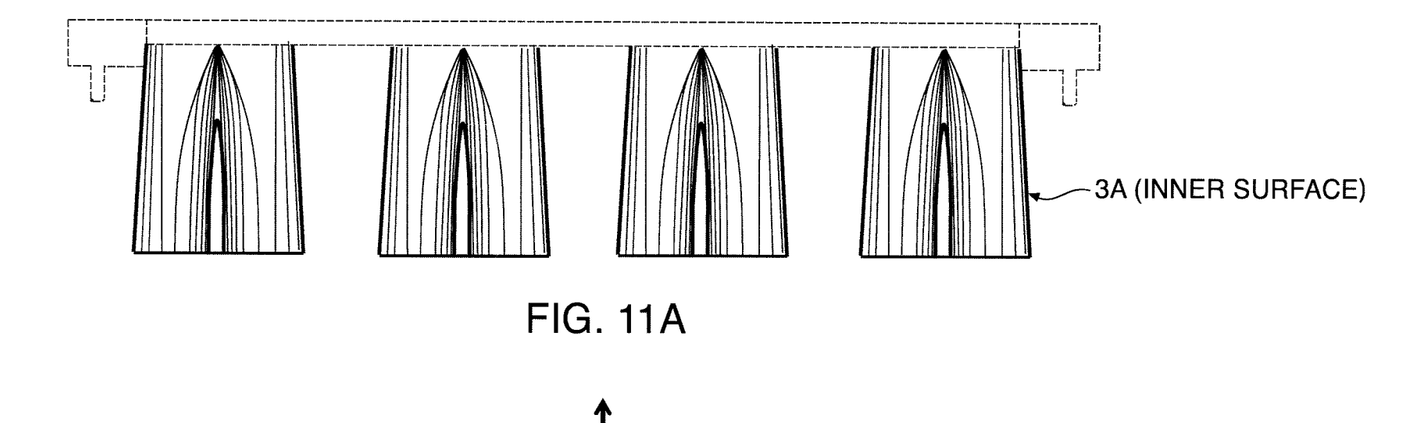
FIGS. 11A and 11B are a plan view of an inner peripheral surface of a sleeve and a plan view illustrating an assembled state of the first die and the fifth die for molding the inner peripheral surface.
Figure 11B:
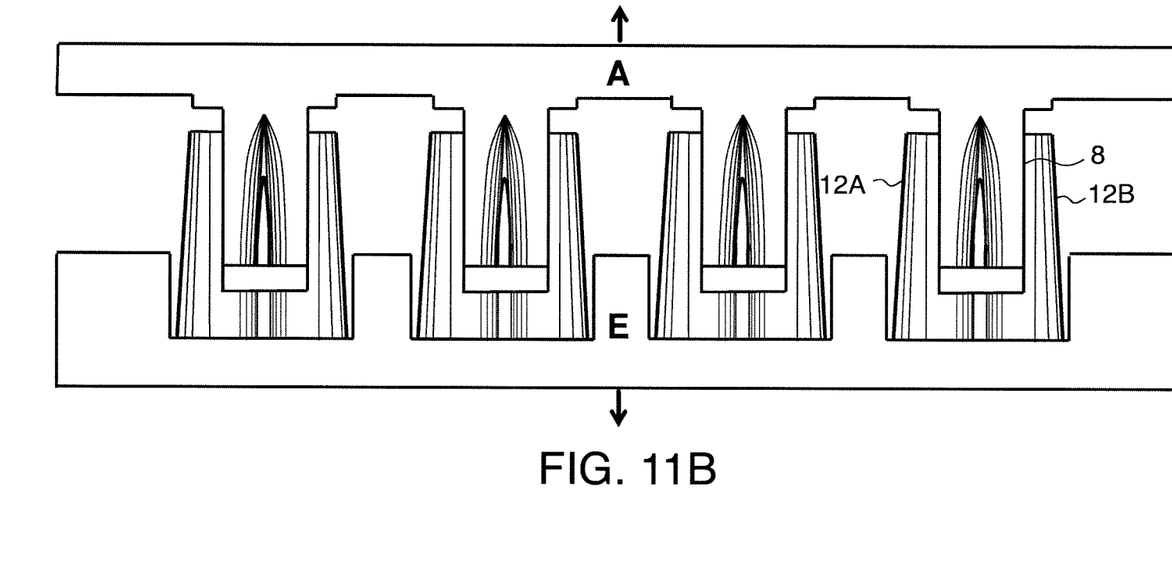

Referring to FIG. 11B, the first die A and the fifth die E are assembled such that the projections 8 are fitted between the pair of projections 12A and 12B, as shown in the figure. The pair of projections 12A and 12B and the bifurcated projections 8, when assembled in this manner, function as an inner die for the sleeve 3A.

Referring back to FIG. 9B, when the first die A and the fifth die E are assembled, the projections 12A and 12B are applied to molding of respective outer sides of the inner peripheral surface of the sleeve 3A, while the bifurcated projections 8 are applied to molding of an inner side of the inner peripheral surface of the sleeve 3A.

After molding the insert 3, the first die A is removed from a molding position in a longitudinal direction extending parallel to a central axis CL of the sleeve 3A by exerting drawing force thereon in a direction heading away from the insert 3, as shown by an arrow in FIG. 10. The fifth die E is removed from a molding position along the central axis CL of the sleeve 3A by exerting drawing force thereon in an opposite direction to the drawing force exerted on the first die A, as shown by an arrow in FIG. 10. In other words, the first die A and the fifth die E are removed in mutually opposite directions.

As shown by a thick line in FIG. 10, to enable removal of the first die A and the fifth die E, a parting line, or in other words a boundary line, between the first die A and the fifth die E is set in accordance with a shape of the inner peripheral surface of the sleeve 3A. Hence, during a molding operation, the inner die is in a state where the bifurcating projections 8 of the first die A are fitted between the pair of projections 12A and 12B of the fifth die E.

By setting the parting line between the first die A and the fifth die E in this manner, the first die A and the fifth die E can both be removed smoothly, without interfering with the irregularities on the inner peripheral surface of the sleeve 3A.

As a result, the complicated shape of the inner peripheral surface of the sleeve 3A, which bifurcates into two forks midway such that the distance Y between the most distant wall surfaces of the two outlets 5 is larger than the distance X between the most distant wall surfaces of the inlet 4, can be molded using two dies, namely the dies A and E.

Next, the outer die of the die assembly 20 will be described.

Figure 7:
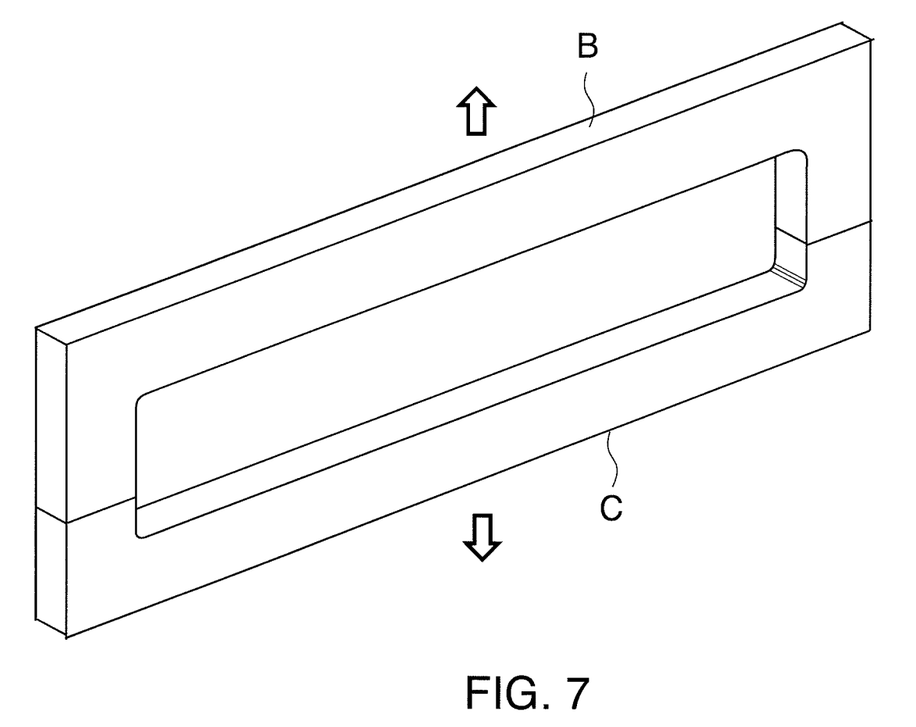
FIG. 7 is a perspective view of a second die and a third die.

Referring to FIG. 7, the second die B and the third die C are dies defining an outer peripheral surface of the flange 3B, and when assembled, form a substantially rectangular space corresponding to the flange 3B on an inner side thereof. The inner die constituted by the first die A and the fifth die E is inserted into this space. The flange 3B is formed from resin injected between the outer die, which is constituted by the second die B and the third die C, and the inner die.

Figure 8:
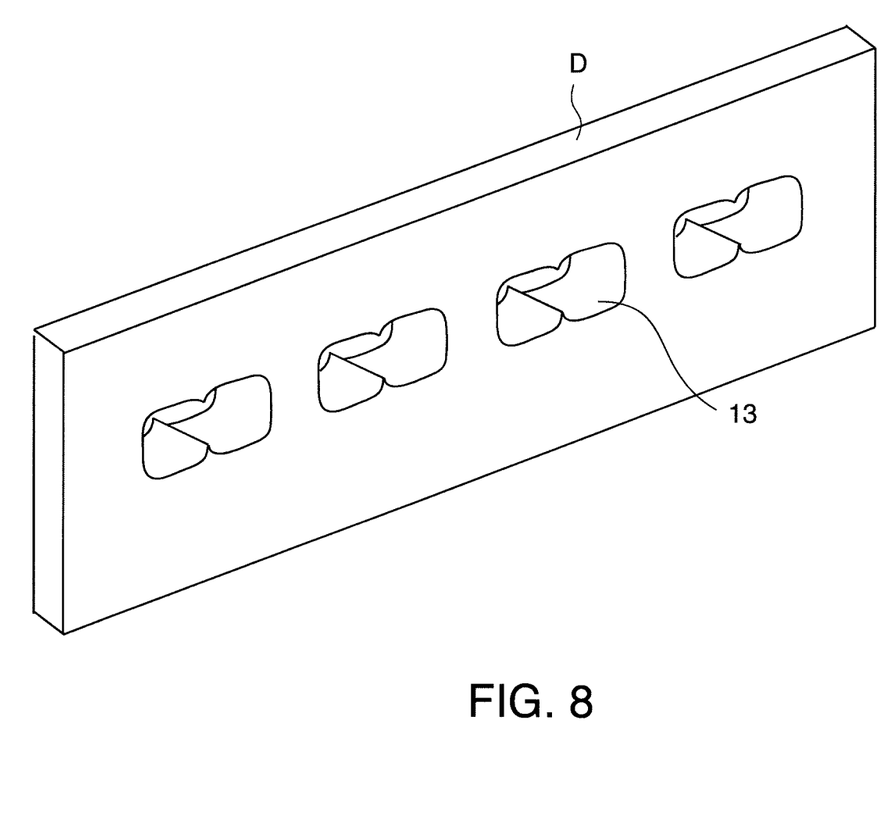
FIG. 8 is a perspective view of a fourth die.

Referring to FIG. 8, the fourth die D includes four holes 13 in positions corresponding to the four sleeves 3A. The holes 13 each have substantially a rounded rectangular cross section that defines the outer peripheral surface of the base portion of the sleeve 3A. The bifurcated projections 8 of the first die A and the pair of projections 12A and 12B of the fifth die are inserted into each hole 13 in mutually opposite directions so as to serve as the inner die. The base portion of the sleeve 3A is formed from resin charged between the inner die and a wall surface of the hole 13.

Referring to FIG. 9B, the fifth die E also serves as an outer die. The fifth die E serving as an outer die includes a recess that has substantially a rounded rectangular cross section and surrounds the pair of projections 12A and 12B. The tip end portion of the sleeve 3A is formed from resin injected between the inner die, which is formed from the pair of projections 12A and 12B and the bifurcated projections 8, and a wall surface of the recess.

Referring back to FIG. 5, when molding using the die assembly 20 is complete, the second die B and the third die C constituting the outer die are removed by exerting force thereon in a direction for separating the second die B and the third die C from each other on an identical plane to the flange 3B of the sleeve 3A, as shown by arrows in the figure.

Figure 12A:
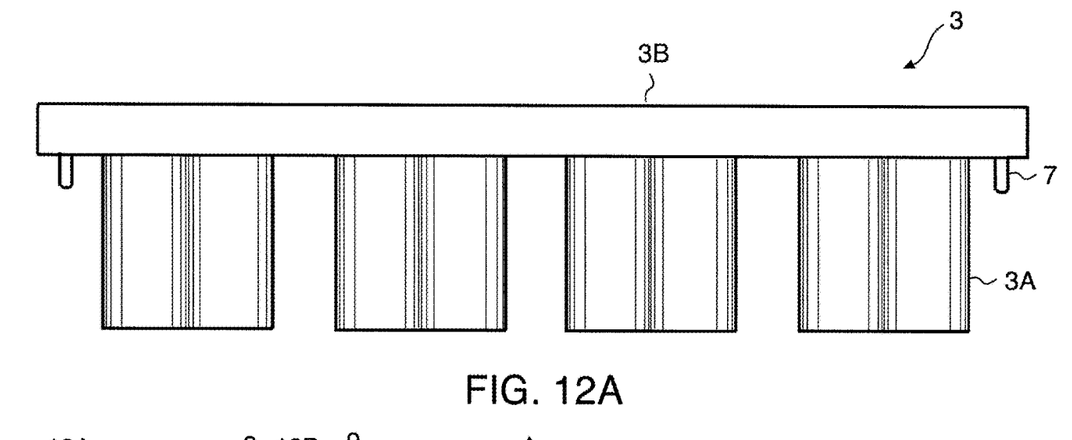
FIGS. 12A and 12B are a plan view of the resin-made insert, and a plan view illustrating an assembled state of the first die, the fourth die, and the fifth die.
Figure 12B:
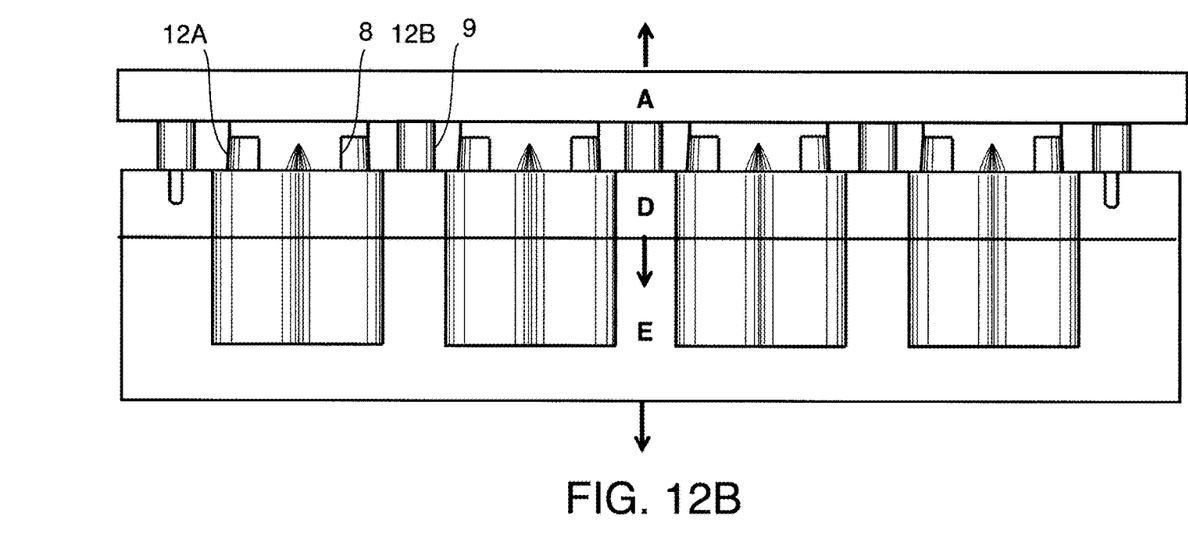

Referring to FIGS. 12A and 12B, as described above, the first die A and the fifth die E are removed from the molding positions thereof by exerting drawing force thereon in opposite directions in a longitudinal direction extending along the central axis CL of the sleeve 3A, as shown by the arrows in the figure. After removing the first die A and the fifth die E, the fourth die D is also removed by exerting drawing force thereon in the same direction as the drawing force exerted on the fifth die E.

There are no particular limitations on the order in which the operation for removing the first die A, the fourth die D, and the fifth die E and the operation for removing the second die B and the third die C are performed, and either one thereof may be performed first.

As a result, the integral insert 3 that includes the sleeve 3A having the outer peripheral surface shown in FIG. 12A and the inner peripheral surface shown in FIG. 11A can be formed by injection molding.

In the embodiment described above, the first die A forms an inlet 4 side part of the inner die of the die assembly 20, and the fifth die E forms an outlet 5 side part thereof.

As described above, the die assembly 20 according to this embodiment of the present invention includes, as the inner die, the inlet 4 side first die A and the outlet 5 side fifth die E, which mold the inner peripheral surface of the sleeve 3A in an assembled state and are removed in mutually opposite directions. The first die A is configured to be removed from the insert 3 following molding of the insert 3 by being displaced in a longitudinal direction of the sleeve 3A and a direction heading away from the inlet 4. The outlet 5 side fifth die E is configured to be removed from the insert 3 following molding of the insert 3 by being displaced in an opposite direction to the direction in which the inlet 4 side first die A is displaced.

By configuring the inner die in this manner, the insert 3, which includes the plurality of sleeves 3A that respectively bifurcate midway so as to have a complicated structure and shape, can be cast easily.

Although the invention has been described above with reference to certain embodiments, the invention is not limited to the embodiments described above. Modifications and variations of the embodiments described above will occur to those skilled in the art, within the scope of the claims.

For example, in the present invention, the die for the insert 3 is constituted by five dies, namely the first to fifth dies A-E, but the essential elements are the first die A and the fifth die E constituting the inner die, and the other dies may be subjected to design modifications as desired.

For example, the fourth die D may be formed integrally with the fifth die E. One or both of the second die B and the third die C may be formed integrally with the first die A. Alternatively, one or both of the second die B and the third die C may be formed integrally with the fourth die D. Furthermore, the second to fifth dies B-E may all be formed as a single integrated die.

The embodiments of this invention in which an exclusive property or privilege is claimed are defined as follows:

1. A die assembly configured to mold a resin-made insert having a sleeve that is inserted into an intake port of an internal combustion engine, the sleeve comprising an inlet into which intake air flows and two outlets from which the intake air flows, the die assembly comprising:
    an outer die configured to form an outer peripheral surface of the insert; and
    an inner die configured to form an inner peripheral surface of the insert,
    wherein
    the inner die includes an inlet side part and an outlet side part that mold the inner peripheral surface of the sleeve in an assembled state, and are removed in mutually opposite directions,
    the outer die and the inner die are configured to form the sleeve such that a distance between most distant wall surfaces of the inlet of the sleeve is smaller than a distance between most distant wall surfaces of the two outlets,
    the inlet side part includes bifurcated projections projecting from a first part of the inlet side part toward the two outlets and having a bifurcation start point, and
    the outlet side part includes a pair of projections projecting from a second part of the outlet side part toward the inlet,
    wherein, in the assembled state of the inner die, the pair of projections reaches beyond the bifurcation start point toward the inlet and comes into contact with the inlet side part at the first part, and the bifurcation projections reach beyond the bifurcation start point toward the two outlets and come into contact with the outlet side part at the second part, so as to make a parting line of the inner die continuously between the first part and the second part such that, in a cross-sectional view of the inner die in the assembled state, the pair of projections forms respective outer sides of the inner peripheral surface of the sleeve and the bifurcation projections form an inner side of the inner peripheral surface of the sleeve.

2. The die assembly according to claim 1, wherein the pair of projections projecting from the two outlets reaches a point where a distance between most distant wall surfaces of the sleeve becomes equal to the distance between the most distant wall surfaces of the inlet.

3. A die assembly configured to mold a resin-made insert having a sleeve that is inserted into an intake port of an internal combustion engine, the sleeve comprising an inlet into which intake air flows and two outlets from which the intake air flows, the die assembly comprising:
    an outer die configured to form an outer peripheral surface of the insert; and
    an inner die configured to form an inner peripheral surface of the insert,
    wherein
    the inner die includes an inlet side part and an outlet side part that mold the inner peripheral surface of the sleeve in an assembled state, and are removed in mutually opposite directions,
    the outer die and the inner die are configured to form the sleeve such that a distance between most distant wall surfaces of the inlet of the sleeve is smaller than a distance between most distant wall surfaces of the two outlets,
    the inlet side part includes bifurcated projections projecting from the inlet toward the two outlets,
    the outlet side part includes a pair of projections projecting from the two outlets toward the inlet, and
    the bifurcated projections of the inlet side part are configured to mold the inner peripheral surface of the sleeve when fitted between the pair of projections of the outlet side part, the bifurcated projections having a bifurcation start point,
    the pair of projections projecting from the two outlets extends beyond the bifurcation start point toward the inlet, and reaches a point where a distance between most distant wall surfaces of the sleeve becomes equal to the distance between the most distant wall surfaces of the inlet, and the inlet side part and the outlet side part are configured to mold the inner peripheral surface of the sleeve such that a cross section area of the inlet equals a total cross-sectional area of the two outlets.

4. The die assembly according to claim 1, wherein the inlet side part is one of a plurality of inlet side parts Which are joined together and the outside part is one of a same number of outlet parts as the inlet side parts, joined together.

* * * * *